United States Patent
Ohshima et al.

[15] 3,641,270

[45] Feb. 8, 1972

[54] TIMER CIRCUIT OF AN AUTOMATIC TELEPHONE-ANSWERING APPARATUS

[72] Inventors: Haruhiko Ohshima, Kawasaki; Hiroshi Mizuno, Nagareyama; Akira Konno, Tokyo; Tomoaki Kosaka, Yachiyo, all of Japan

[73] Assignee: Pioneer Electronic Corporation, Tokyo, Japan

[22] Filed: June 11, 1970

[21] Appl. No.: 45,533

[30] Foreign Application Priority Data

June 11, 1969 Japan....................................44/54902

[52] U.S. Cl................................................179/2 A, 179/6 R
[51] Int. Cl.........................................................H04m 11/10
[58] Field of Search.........................................179/2 A, 6 R, 6 E

[56] References Cited

UNITED STATES PATENTS 2,881,252 4/1959 Zimmermann..........................179/6 R

FOREIGN PATENTS OR APPLICATIONS 1,373,160 8/1964 France..................................179/6 R

*Primary Examiner*—Ralph D. Blakeslee
*Attorney*—Sughrue, Rothwell, Mion, Zinn & Macpeak

[57] ABSTRACT

A timer circuit for controlling the operation of an automatic telephone-answering apparatus, in which a condenser of a RC timer circuit is not charged with the current of a DC source but is charged with a rectified ringing current and then gradually discharged. During the discharging period, a switching circuit is continuously kept in the ON state thereby causing the automatic telephone-answering apparatus to operate.

3 Claims, 2 Drawing Figures

INVENTORS
HARUHIKO OHSHIMA
HIROSHI MIZUNO
AKIRA KONNO
TOMOAKI KOSAKA

BY Sughrue, Rothwell, Mion, Zinn & Macpeak
ATTORNEYS

TIMER CIRCUIT OF AN AUTOMATIC TELEPHONE-ANSWERING APPARATUS

BACKGROUND OF THE INVENTION

1. Field of the Invention

This invention relates generally to an automatic telephone-answering apparatus, and more particularly to a timer circuit for controlling the operation of the apparatus.

2. Description of the Prior Art

A general timer means of an automatic telephone-answering apparatus is a mechanical timer means or an electrical timer means or an electrical timer means using a charging and discharging current of a condenser. The mechanical timer gives a long and accurate time period but requires many parts, is expensive to make, and complex and comparatively large in construction. Therefore, it is impractical to make the apparatus small, light and inexpensive. The prior art electrical timer requires a comparatively large and expensive condenser to get a long time period, because the DC source voltage for a transistor circuit is generally low, for example 12 volts.

SUMMARY OF THE INVENTION

It is the main object of the present invention to provide a novel and improved timer circuit for an automatic telephone-answering apparatus which obtains a comparatively long time period without making use of a large condenser.

DESCRIPTION OF THE PREFERRED EMBODIMENT

Figure 1:
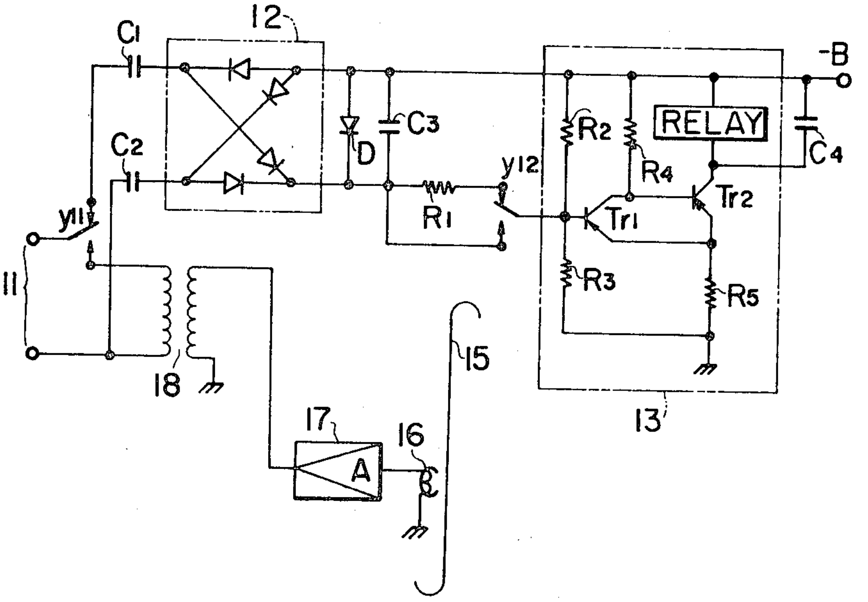
FIG. 1 is a circuit of one embodiment of the present invention.

Referring now to FIG. 1, the timer circuit of this invention comprises a terminal 11 to which a telephone line is connected. A rectifier circuit 12 is composed of a bridge circuit whereby a bell signal, that is a ringing current, coming from the telephone line is rectified through coupling condensers C1 and C2. A constant-voltage diode D smooths the current from the rectifier circuit 12. A Schmitt circuit 13 is composed of transistors T*r*1 and T*r*2, resistors R2–R5 and a relay Y1 connected as its load. Condenser C3 and resistor R1 determine the time period. A condenser C4, which is connected in parallel with relay Y1, keeps the relay Y1 in the energized state for a moment after a DC source current to the relay Y1 is stopped. The device also includes magnetic tape 15, on which outgoing messages for a caller is previously recorded, a magnetic head 16 associated with the magnetic tape 15, and an amplifier 17 which amplifies the output signal of the magnetic head 16 and sends it to the caller through a matching transformer 18 and a contact Y11 of relay Y1.

Each resistance value of resistors R2–R5 has been previously determined so that the transistor T*r*1 of the Schmitt circuit 13 is ON and the transistor Tr2 OFF in the standby state awaiting the bell signal.

In this circuit, when the ringing current comes to the terminal 11, the current flows through condensers C1 and C2, and is rectified by the rectifier circuit 12, stabilized by the constant-voltage diode D and then charges condenser C3. When the voltage added to a base of the transistor T*r*1 through the resistor R1 reaches voltage *e*2, transistor T*r*1 is switched OFF and the transistor T*r*2 turns ON thereby energizing relay Y1. The contacts *y*11 and *y*12 are switched by the energization of relay Y1 and matching transformer 18 is connected to the telephone line through contact *y*11 and terminal 11. The magnetic tape transporting mechanism (not shown) starts to operate with the switching of contact *y*13 (not shown) of the relay Y1 thereby running magnetic tape 15. The outgoing message for the caller is reproduced by the magnetic head 16, amplified by the amplifier 17, and sent out to the caller through the matching transformer 18 and the terminal 11.

Figure 2:
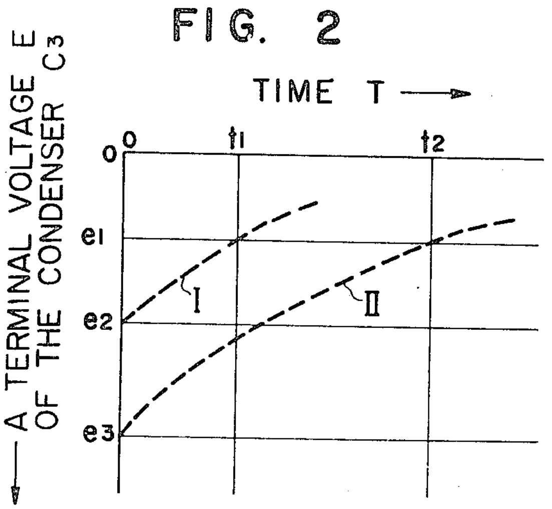
FIG. 2 is a discharging characteristic of a condenser to use for the explanation of the operation of the circuit shown in FIG. 1.

When the contact *y*12 is switched, the base voltage of the transistor T*r*1 goes to the voltage *e*1, as shown in FIG. 2. *e*1 is determined by resistors R2 and R3. Transistor T*r*1 is thereby switched ON and transistor T*r*2 is turned OFF. Relay Y1 is held energized by the discharging current of the condenser C4.

The condenser C3 is directly connected to the base of the transistor T*r*1 by the switched contact *y*12. While condenser C3 is discharging to the voltage *e*1, the Schmitt circuit 13 is held switched and the relay Y1 is continuously energized.

Referring now to FIG. 2, the operation of the circuit shown in FIG. 1 will be further explained in detail. In the standby state, the base voltage of the transistor T*r*1 determined by the resistors R2 and R3 is shown as *e*1. The lowest base voltage at which transistor T*r*1 is turned to OFF is shown as *e*2, and the terminal voltage of the condenser C3 at the moment that the transistor T*r*1 is turned OFF is shown as *e*3. The base voltage transistor T*r*1 is gradually raised by the ringing current, and when the voltage reaches *e*2, transistor T*r*1 turns OFF. At this time, the relay Y1 is energized and the contact *y*12 is switched, and the condenser C3 which has been charged to the voltage *e*3 is directly connected to the base of the transistor T*r*1. The curve I shown in FIG. 2 shows the discharge of condenser C3 when condenser C3 is connected to the base of the transistor T*r*1 through the resistor R1 after the relay Y1 has been energized. The transistor T*r*1 is held OFF for the period beginning with the operation of relay Y1, that is $T=0$ and ending at $T=t$. In the circuit of FIG. 1, condenser C3 is directly connected to the base of the transistor T*r*1 without the resistor R1 after the relay Y1 is energized, (as shown in the curve II) and transistor T*r*1 is continuously held OFF till the time $T=t2$.

In this invention, as set forth above, a condenser is charged by the rectified current of the ringing current which is comparatively high voltage (for example, the voltage is usually 45–70 volts in Japan), without using the DC source for a transistor circuit (the voltage is usually about 12 volts). After the relay Y1 is energized, the high voltage charging the condenser is used to determine the time period. Therefore, the condenser C3 may be of comparatively small capacity, small in size and inexpensive to produce.

An automatic telephone-answering apparatus, which records an incoming message from a caller after the outgoing message is reproduced and sent out needs a long time compared to the above-described device, because the total operation time of the apparatus is longer than that of this embodiment. Therefore, the timer circuit of this invention is also useful for that apparatus.

What is claimed is:

1. A timer circuit of an automatic telephone-answering apparatus comprising: a rectifier circuit to rectify a ringing current, a condenser charged by said rectified current, a switching circuit connected to said condenser through a resistor and operable when an input voltage reaches a predetermined level, a relay energized by said switching circuit, first contact means responsive to energization of said relay for disconnecting the rectifier circuit from a telephone line and for connecting a matching transformer to the telephone line, second contact means for connecting said condenser to said switching circuit directly without said resistor, and a means for holding said relay energized during the switching time of said second contact.

2. A timer circuit of an automatic telephone-answering apparatus as set forth in claim 1, wherein the switching circuit is the Schmitt trigger circuit.

3. A timer circuit of an automatic telephone-answering apparatus as set forth in claim 1, wherein said first and second contact means are contacts of the relay.

* * * * *